United States Patent
Spaggiari

(10) Patent No.: US 6,848,158 B2
(45) Date of Patent: Feb. 1, 2005

(54) DEVICE FOR INSERTING AND EXTRACTING A SUPPORT RING IN A TIRE

(75) Inventor: Rino Spaggiari, Correggio (IT)

(73) Assignee: Snap-On Equipment S.r.l., Correggio (IT)

( * ) Notice: Subject to any disclaimer, the term of this patent is extended or adjusted under 35 U.S.C. 154(b) by 408 days.

(21) Appl. No.: 10/173,750

(22) Filed: Jun. 19, 2002

(65) Prior Publication Data

US 2003/0098129 A1 May 29, 2003

(30) Foreign Application Priority Data

Nov. 27, 2001 (IT) ...................................... MO2001A0234

(51) Int. Cl.⁷ .............................................. B25B 27/14
(52) U.S. Cl. .............................. 29/273; 29/802; 29/894; 29/426.5; 29/252
(58) Field of Search ........................... 29/273, 802, 894, 29/252, 426.5; 157/11, 1.3; 152/17, 213 R, 520

(56) References Cited

U.S. PATENT DOCUMENTS

| | | | | |
|---|---|---|---|---|
| 4,771,531 A | * | 9/1988 | Asher | .......................... 29/426.3 |
| 5,464,314 A | * | 11/1995 | Laaksonen | ................... 414/427 |
| 5,598,620 A | * | 2/1997 | Servones | ...................... 29/273 |
| 6,609,293 B2 | * | 8/2003 | Corghi | ......................... 29/802 |

FOREIGN PATENT DOCUMENTS

WO      WO 00/78567      12/2000

* cited by examiner

Primary Examiner—David P. Bryant
Assistant Examiner—Stephen Kenny
(74) Attorney, Agent, or Firm—Browdy and Neimark, P.L.L.C.

(57) ABSTRACT

The device comprises a base for positioning a tire and a lever pivoted on a support and able to move and be fixed in position along a plane which is radial with respect to the center of the base. An active end of the lever, located on an L-shaped bend at an end of the lever, can be introduced internally of the opening to interact contactingly with the internal surface of a part of the support ring pre-inserted in the opening. By acting on the lever, the active end presses the ring against the inside of the tire with radial force. The support ring is of a type which when applied on a vehicle wheel enables the vehicle to continue moving for a considerable time even where tire pressure is suddenly lost.

12 Claims, 3 Drawing Sheets

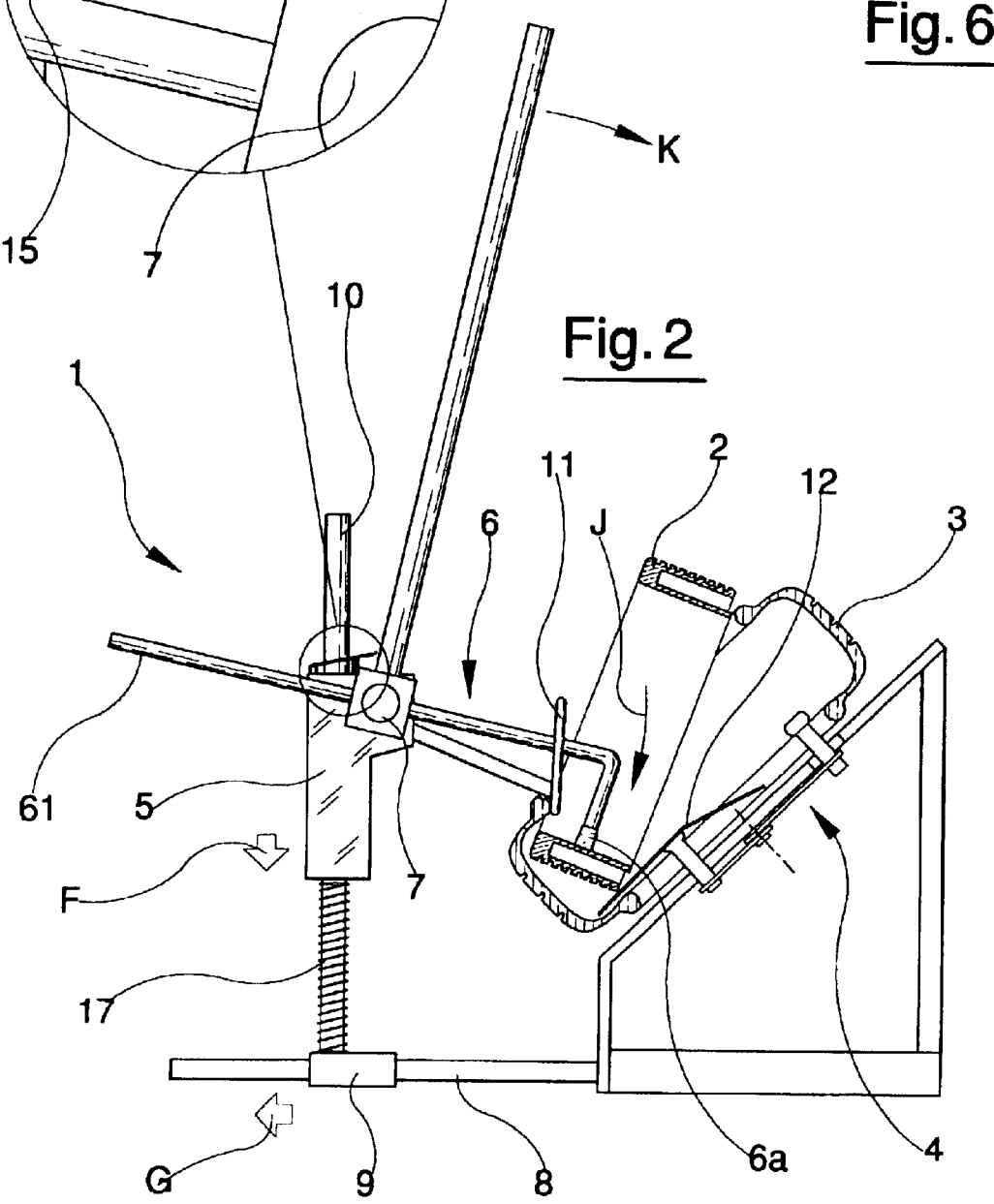

DEVICE FOR INSERTING AND EXTRACTING A SUPPORT RING IN A TIRE

BACKGROUND OF THE INVENTION

Reference is particularly made to a support ring which is inserted in a wheel tire to guarantee that even in the event of a sudden loss of pressure in the tire, the vehicle can proceed safely.

A tire of this type exists in the prior art. It is distinguished by the fact that it does not flatten, even on loss of pressure, thanks to a rigid ring inserted by force on the rim of the wheel. In this case the spare wheel is no longer necessary. Before mounting the tire on the rim, the support ring is inserted into the tire. Generally the tire is of a special type, in which the diameters of the beads are different, making it easier to insert the support ring through the larger-diameter bead.

The main aim of the present invention to provide a device for rendering insertion of the support ring into the tire easier.

The invention also has the aim of making extraction of the ring from the tire easier, using known means.

An advantage of the invention is to realise a device by which it is possible to insert the ring very rapidly and efficiently.

A further advantage of the invention is the simplicity of use of the device.

A further advantage is to provide a device which is constructionally simple and economical.

These aims and advantages and others besides are all achieved by the present invention, as it is characterised in the claims that follow.

SUMMARY OF THE INVENTION

The invention consists in a device for inserting and extracting a support ring in a tire, comprising: a base for stably positioning and centring the tire in such a way that a central opening of the tire is accessible; a support arranged by a side of the base which is positionable by nearing and distancing to and from a center of the base; a lever moveably pivoted to the support, which can be fixed in positions along a plane passing through the central opening of the tire and arranged radially with respect to the center of the base, an active end of the lever being able to assume at least one external position, in which the active end is outside the central opening of the tire, and at least one internal position, in which the active end is internal of the central opening of the tire and in contacting interaction with an internal surface of a part of the support ring; the active end, by effect of activation of the lever, pressing the part of ring against the inside of the tire with a force having at least one radial component.

BRIEF DESCRIPTION OF THE DRAWINGS

Further advantages of the present invention will better emerge from the detailed description that follows of a preferred but non-exclusive embodiment of the invention, illustrated purely by way of non-limiting example in the accompanying figures of the drawings, in which:

FIG. 2 is a side view in vertical elevation, with some parts in section, of the device of FIG. 1 while it is being applied to insert a ring in a tire;

FIG. 6 shows the ring inserted in the tire.

DESCRIPTION OF THE PREFERRED EMBODIMENTS

Figure 1:
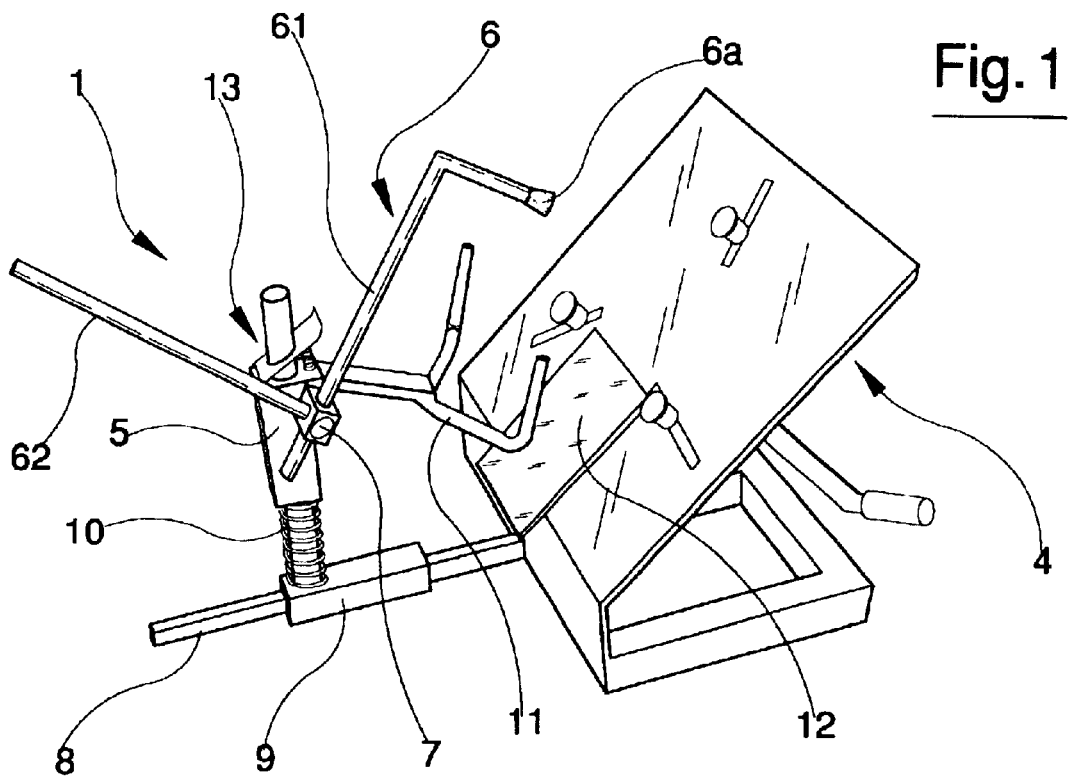
FIG. 1 is a perspective view of an embodiment of the invention.

With reference to the figures of the drawings, 1 denotes in its entirety a device for favouring insertion of a safety support ring 2 inside a tire 3. The tire 3 is preferably of a type having two beads of different diameters so that it presents on one side a central opening which is larger than the other, through which the support ring 2 can be inserted. At a later stage of the process the support ring is mounted on the rim (a stage which does not directly involve the present device), to be force-inserted about the rim.

The insertion device 1 comprises a base 4 for stably positioning and centring the tire 3 so that the central opening of the tire 3 faces the operator and is easily accessible from the outside. In the preferred embodiment the base 4 comprises a rest plane arranged oblique with respect to the horizontal so that once the tire 3 is centered on the base 4, the central opening is facing upwards.

In the following description reference will be made to the tire 3 arranged centered on the base 4; the term external bead will refer to the bead of the tire 3 which is facing upwards and which delimits the opening for introduction of the ring, while the term internal bead will refer to the opposite bead, facing downwards and towards the base 4.

The base 4 for positioning and centring is provided with a centring system having three radially-mobile organs, which are coordinated with each other and with the center of the base by means of, for example, a handle.

The insertion device 1 comprises a support 5 arranged side-by-side with the base 4, which is positionable by distancing and nearing to and from the center of the base 4.

A lever 6 is pivoted on the support 5 and can move and be fixed in position along a preferably vertical plane which passes through the central opening of the tire and which is arranged radially with respect to the center of the base 4. The lever 6 exhibits an active end 6a which can assume at least one external position, in which it is outside the central opening of the fire, and at least one internal position, in which it is internal of the opening and interacts contactingly with the internal surface of a part of the support ring 2 inserted in the opening; also, by effect of the activating of the lever 6, the active position 6a presses the part of the ring 2 against the inside of the tire 3 with a force having at least one radial component.

The active end 6a of the lever is located on a tract of end of the lever which is bent towards the inside of the tire centered on the base 4. This bend is L-shaped.

The base 4 is oblique with respect to both the sliding axis of the horizontal guide 8 and the sliding axis of the vertical guide 10.

The lever 6 is a first-class lever and comprises two arms 61 and 62, one transversal with respect to the other, in which the arm 61 bearing the active end is mobile in order to vary the distance between the active end and the pivot 7.

The support 5 is mounted on a fine and can be displaced along a plane which is parallel to the movement plane of the lever 6; it can also be fixed in position. The displacements of the support 5 are along two mutually-transversal sliding axes. An axially-sliding first guide 8 is horizontal and solidly constrained on the base 4; a slide 9 can be positioned along the first guide 8; the slide 9 bears a second guide 10 which can move axially and vertically; the lever support 5 is slidable along the second guide 10.

The support 5 frontally bears a pusher tool 11 facing towards the center of the base 4 and arranged between the lever 6 and a part of the external bead of the tire. The tool 11 has two lateral horns internal parts of which, by effect of movement of the support 5, can partially enter the central opening and keep the part of external bead pushed outwards so that the tire central opening is made larger.

The device 1 further comprises a sliding plane 12 to guide the support ring, located on the base 4 in such a way as to cover at least a part of the centered tire opening opposite to the opening of the tire through which the ring is mounted.

The sliding plane 12 is located so as to cover a part of the internal bead of the tire opposite to a part of the external bead of the tire at which the support ring will be partially inserted into the opening.

The support 5 is fixable in position along the vertical guide 10 by means of a clamping system 13 (enlarged in the detail of FIG. 2), comprising a holed plate element 14 hinged at 15, with the hole inserted with modest play in the vertical guide 10; a spring 16 keeps the support 5 blocked in position by effect of the friction between the inside rim of the hole and the slide 10; to unblock the support it is sufficient to press down on the spring 16. An upwardly-directed elastic force produced by a spring 17 acts on the support.

The means for removably fixing the slide 9 in position on the guide 8 are of known type and are not illustrated, as are the means for removably fixing the rotation of the lever 6 about the pivot 7, as indeed are the means for removably fixing the arm 61 of the guide situated in the zone where the arms 61 and 62 meet.

During operation, after the tire 3 has been arranged on the base 4, the support 5 is neared to the center of the base 4 by sliding the horizontal-axis lower slide 9. In this nearing stage by horizontal movement, the active end 6a of the lever 6 and the pusher tool 11 are located at a height which enables passage through the obliquely-arranged opening of the tire 3. When the pusher tool 11, during the nearing operation, passes through the lower part of the external bead, the tool 11 is lowered (by movement of the support 5 along the vertical guide 10 in the direction of arrow F) and distanced (by moving the slide 9 along the horizontal guide in the direction of arrow G), until the two external projections of the tool 11, horn-shaped, push the lower part of the external bead outwards, in the direction of arrow G. The slide 9 and the support 5 are fixed in these positions so that the lower part of the external bead remains pushed and deformed towards the outside and during the subsequent operations the tire opening is stretched and enlarged.

Figure 3:
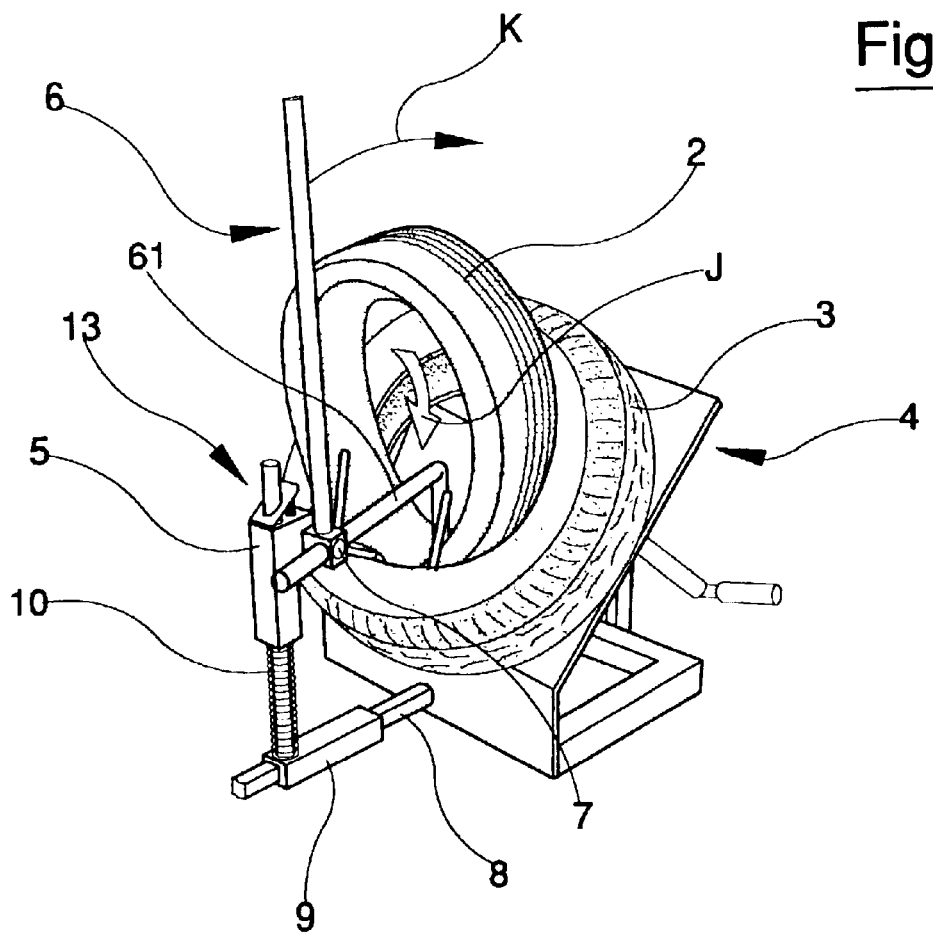
Figure 4:
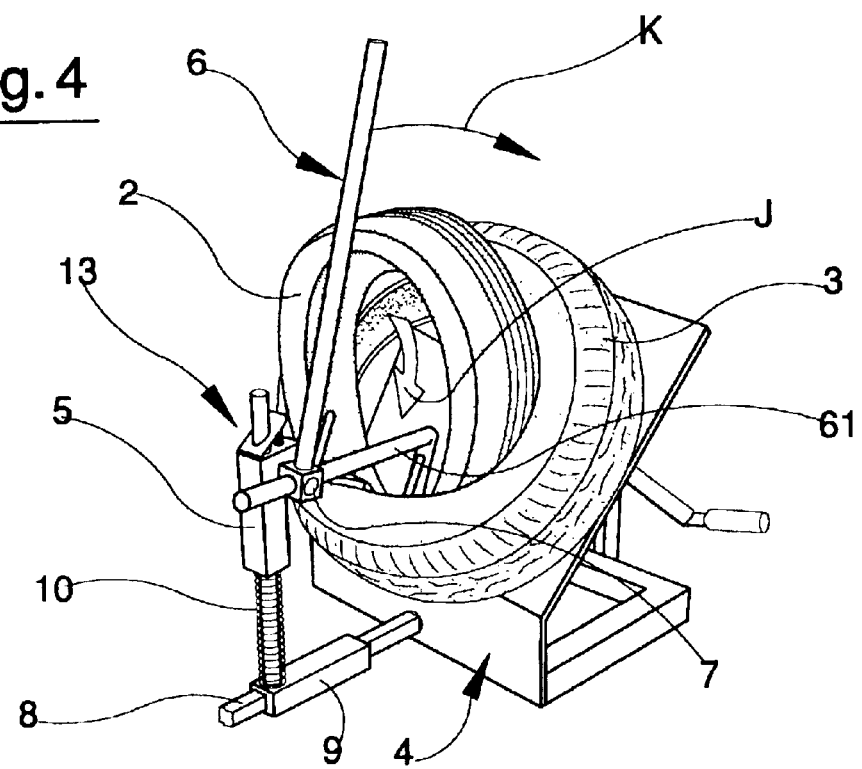

At this point the support ring 2 can be partially inserted (see FIG. 3) between the tool 11 and the sliding plane 12 which favours the insertion.

Figure 5:
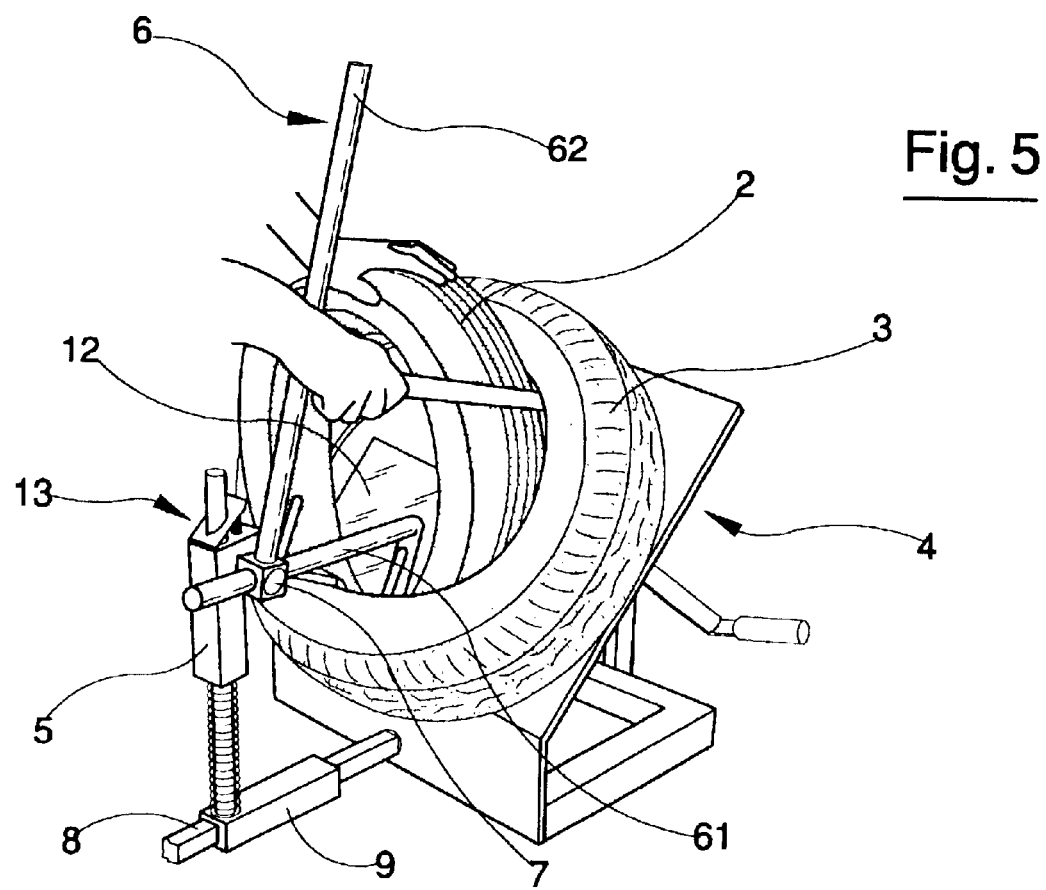
FIGS. 3, 4 and 5 show three successive stages of the insertion of the support ring in a tire.

The active end 6a of the lever, which is positioned above and forward of the pusher tool 11, is pushed downwards in direction J by effect of a rotation of the lever about the pivot 7 (force is applied on the upper arm manually by an operator, as indicated by arrow K). The pivot 7 has a rotation axis which is horizontal and perpendicular to the sliding axes of the guides 8 and 10. The active end 6a, in contact with the internal side of the support ring 2, pushes the ring 2 towards the inside of the tire 3 with a prevalently radially-directed pushing force with respect to the tire 3. The lever 6 is then fixed in position, generally in a position in which the support ring 2 is not yet fully inserted in the tire 3; in this position the lever 6 acts with a certain pressure which tends to force the insertion. In this configuration (FIG. 5) one final action is sufficient, relatively simple and requires a smaller effort on the part of the operator to force insertion of the upper part of the support ring 2 still partly outside the tire 3. This final action can be advantageously done by using known-type tools for stretching the upper part of the external bead. The support 5, during the pushing stage of the active end 6a is subject to a rotational constraint due to the hexagonal shape of the guide 10. The support 5 is also provided with a device for immediately reaching the maximum height by means of a rotation of the lever 6 in an anti-clockwise direction, freeing the clamping system 13. When it reaches the maximum height the support 5 unhooks from its rotational constraint originated by the hexagonal guide 10 and can freely rotate to displace the lever 6 and the tool 11 from the work area.

What is claimed is:

1. A device for inserting and extracting a support ring in a tire, comprising:
   a base for stably positioning and centring the tire in such a way that a central opening of the tire is accessible;
   a support arranged by a side of the base which is positionable by nearing and distancing to and from a center of the base;
   a lever moveably pivoted to the support, which can be fixed in positions along a plane passing through the central opening of the tire and arranged radially with respect to the center of the base, an active end of the lever being able to assume at least one external position, in which the active end is outside the central opening of the tire, and at least one internal position, in which the active end is internal of the central opening of the tire and in contacting interaction with an internal surface of a part of the support ring; the active end, by effect of activation of the lever, pressing the part of ring against the inside of the tire with a force having at least one radial component.

2. The device of claim 1, wherein the active end of the lever is located on an L-shaped bend in the lever facing towards an inside of the tire.

3. The device of claim 2, wherein the support is mobile with respect to the base according to at least one axis of displacement and that the base is oblique with respect to the axis of displacement of the support.

4. The device of claim 3, wherein the lever is a first-class lever and comprises two arms, one transversal to another, in which an arm of the two arms bearing the active end is mobile in such a way as to vary a distance between the active end and the pivot.

5. The device of claim 3, wherein the support is mounted on a frame and can be displaced along a plane which is parallel to a plane of movement of the lever, and can be fixed in a position.

6. The device of claim 5, wherein displacement of the support is achieved along two sliding axes, one of which sliding axes is transversal to another of which sliding axes.

7. The device of claim 6, comprising an axially-sliding first guide, solidly constrained on the base, along which a slide can be positioned, which slide bears an axially-sliding second guide, along which the support is slidable.

8. The device of claim 7, wherein the support frontally bears a pusher tool facing towards the center of the base, which pusher tool is arranged between the lever and a part of an external bead of the tire; the pusher tool being provided with two lateral horns which, by effect of displacements of the support, can make at least a partial entry into the opening of the tire and keep the part of the external bead of the tire stretched in an outwards direction.

9. The device of claim 8, wherein the support is provided with a device which enables the support immediately to reach a maximum height thereof through a rotation of the lever which frees the clamping device.

10. The device of claim 9, wherein on reaching the maximum height a constraint against rotation between the support and the second guide is removed.

11. The device of any one of the preceding claims, comprising a sliding plane for guiding the support ring, which sliding plane is located on the base in such a way as to cover at least a part of the tire opening centered on the base and located opposite the tire opening.

12. The device of claim 11, wherein the sliding plane is located in such a way as to cover at least a part of an internal bead of the tire opening located opposite a part of the external bead of the tire opening at which the partial entry of the support ring is made.

* * * * *